United States Patent
Bieniek et al.

(10) Patent No.: US 11,187,178 B1
(45) Date of Patent: Nov. 30, 2021

(54) SYSTEM AND METHOD FOR PREVIEWING VEHICLE EMISSIONS

(71) Applicant: Ford Global Technologies, LLC, Dearborn, MI (US)

(72) Inventors: Mitchell Bieniek, Garden City, MI (US); Michael Hopka, Milford, MI (US); Michiel J. Van Nieuwstadt, Ann Arbor, MI (US); Brien Lloyd Fulton, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/118,446

(22) Filed: Dec. 10, 2020

(51) Int. Cl.
| | | |
|---|---|---|
| *F02D 41/30* | (2006.01) | |
| *F02D 21/08* | (2006.01) | |
| *F02D 23/00* | (2006.01) | |
| *F01N 3/20* | (2006.01) | |
| *F02D 13/02* | (2006.01) | |
| *F01N 9/00* | (2006.01) | |

(52) U.S. Cl.
CPC .......... *F02D 41/30* (2013.01); *F01N 3/2006* (2013.01); *F02D 13/0242* (2013.01); *F02D 21/08* (2013.01); *F02D 23/00* (2013.01); *F01N 9/005* (2013.01); *F02D 2200/701* (2013.01)

(58) Field of Classification Search
CPC .......... F02D 41/30; F02D 21/08; F02D 23/00; F02D 13/0242; F02D 2200/701; F01N 3/2006; F01N 9/005
USPC ......... 123/672, 676; 701/103–105, 414, 415, 701/423
See application file for complete search history.

(56) References Cited

U.S. PATENT DOCUMENTS

| | | |
|---|---|---|
| 7,159,551 B2 | 1/2007 | Cecur et al. |
| 7,404,383 B2 | 7/2008 | Elendt |
| 8,015,805 B2 | 9/2011 | Pfaeffle et al. |
| 8,392,091 B2 | 3/2013 | Hebbale et al. |
| 9,605,603 B2 | 3/2017 | Glugla et al. |
| 10,450,930 B2 | 10/2019 | Smith et al. |

FOREIGN PATENT DOCUMENTS

WO     2016174015 A1    11/2016

*Primary Examiner* — Hai H Huynh
(74) *Attorney, Agent, or Firm* — Geoffrey Brumbaugh; McCoy Russell LLP

(57) ABSTRACT

Methods and systems for operating an engine that includes an after treatment system are described. In one example, traffic data and navigation system data are a basis for deciding whether or not to increase heat output of an engine to ensure operation of the after treatment system. In particular, one or more actuators may be adjusted to minimize fuel consumption and/or reduce feedgas emissions while generating sufficient heat to maintain after treatment system operation.

20 Claims, 4 Drawing Sheets

SYSTEM AND METHOD FOR PREVIEWING VEHICLE EMISSIONS

BACKGROUND/SUMMARY

An exhaust after treatment system may include a catalyst (e.g., an oxidation catalyst or a three-way catalyst), a selective catalytic reduction (SCR) catalyst, and/or lean NOx trap (LNT) for capturing NOx. These after treatment system components may operate most efficiently at temperatures that are greater than ambient temperatures. Therefore, it may be desirable to maintain these devices at higher temperatures. However, a vehicle may be stopped in traffic for a longer amount of time such that the vehicle's engine is idling. The idling engine may generate very little heat, especially if the engine is a diesel engine. Consequently, the engine's after treatment system temperature may be lowered causing tailpipe emissions to increase. Therefore, it may be desirable to provide a way of maintaining or increasing engine exhaust gas temperature during engine idle and low load conditions so that engine emissions may be reduced.

The inventors herein have recognized the above-mentioned disadvantages and have developed a method for operating an engine, comprising: predicting vehicle operating conditions including an exhaust gas temperature profile according to navigational data and traffic data along a travel route; and adjusting one or more actuators to provide a requested amount of exhaust gas heat to maintain or increase exhaust gas temperature and to provide engine feedgas emissions required to achieve a target emissions level while minimizing fuel consumption based on an expected vehicle speed and engine load profile that is based on the travel route.

By adjusting one or more engine actuators to increase engine exhaust gas temperature and to provide engine feedgas emissions required to achieve a target emissions level while minimizing fuel consumption, it may be possible to meet vehicle emissions requirements even during conditions when an engine may idle longer than desired. For example, a vehicle's geographical location may be determined via a navigation system and the vehicle's position may be used to determine road speed limits, stopping requirements, road grades, and vehicle traffic conditions. These operating conditions may be determined for a preview horizon (e.g., a section or distance of a road along a travel route of a vehicle, such as 500 meters of a section of a road), and these operating conditions may be the basis for estimating engine feedgas (e.g., engine exhaust gases that exit cylinders and that have not been processed via an after treatment system) emissions and engine exhaust gas temperatures. If vehicle tailpipe emissions are expected to be above statutory emissions levels due to vehicle driving conditions, engine operation may be adjusted before the vehicle reaches the location where the engine has less capacity to maintain engine exhaust gases at a higher temperature, thereby extending efficient operation of the after treatment device when the engine reaches the location where the engine has less capacity to maintain higher feedgas temperatures. Further, the engine feedgas emissions may be lowered while efforts are made to maintain engine fuel efficiency during vehicle operating conditions that may result in lower engine speeds and loads. For example, actions may be taken to lower feedgas HC and NOx.

The present description may provide several advantages. In particular, the approach may reduce tail pipe emissions levels. In addition, the approach may maximize vehicle fuel efficiency while maintaining after treatment system temperature. Further, the approach may apply a priori data to estimate engine operating conditions in the future so that mitigating actions may be applied before engine emissions may increase.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
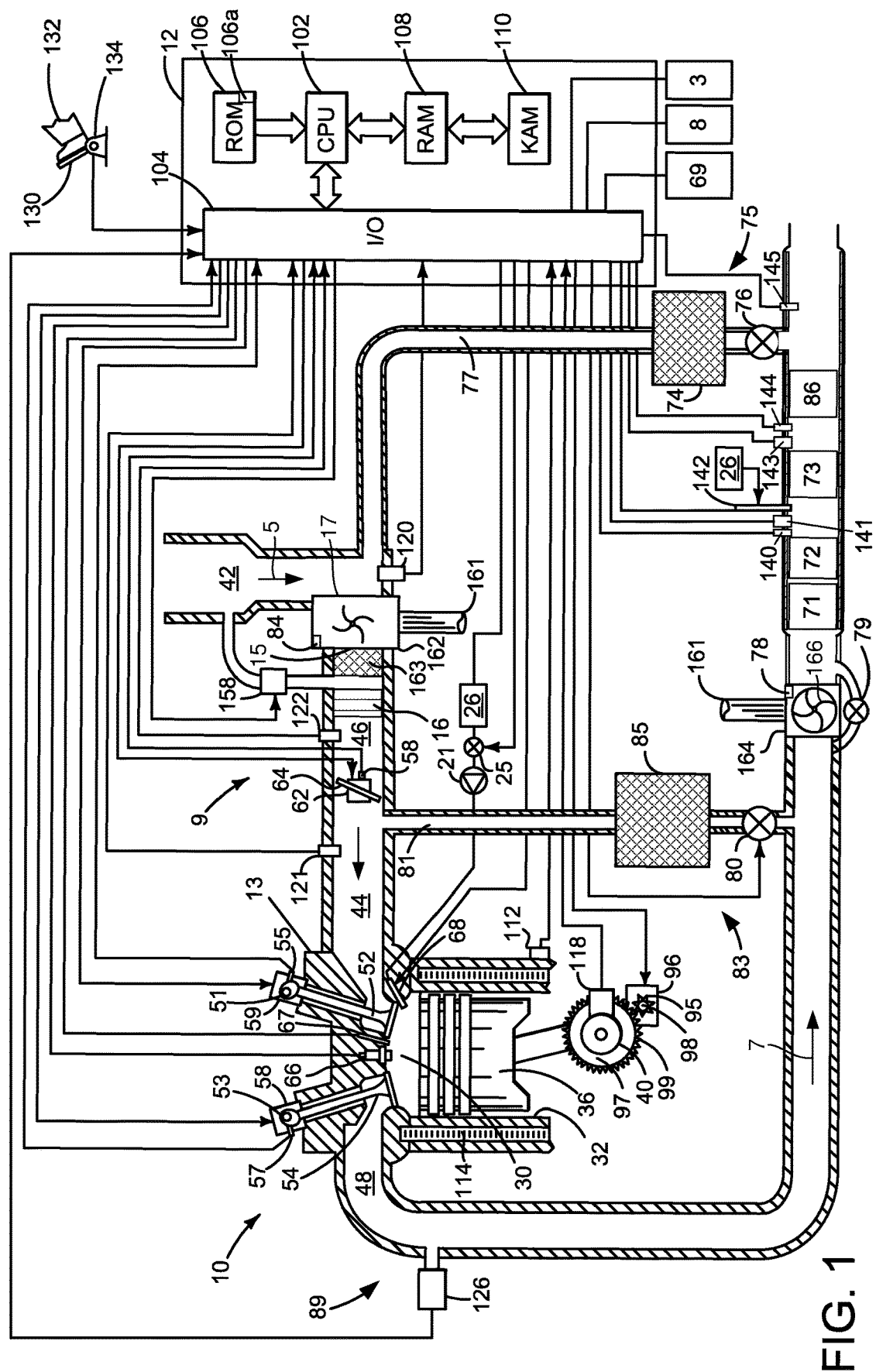
FIG. 1 shows a detailed schematic depiction of an example engine.

The present description is related to improving vehicle emissions while operating an engine efficiently. In one example, GPS data and traffic data are applied to model engine operation at a future time and future location along a vehicle's travel route. The modeled engine operation is a basis for determining whether or not efficiency of an exhaust after treatment system may be maintained throughout a travel route without taking mitigating actions. The engine may continue to operate without vehicle route control adjustments if vehicle emissions are expected to be within statutory limits. However, engine control adjustments may be made if vehicle emissions are expected to be out of statutory limits. The vehicle may include an engine system as shown in FIG. 1. The engine system may operate according to the sequence of FIG. 2 and the methods in FIG. 3. The engine system may be included in a vehicle that travels on a route and receives GPS data and traffic data as shown in FIG. 4.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57. Intake poppet valve 52 may be operated by a variable valve activating/deactivating actuator 59, which may be a cam driven valve operator (e.g., as shown in U.S. Pat. Nos. 9,605,603; 7,404,383; and 7,159,551 all of which are hereby fully incorporated by reference for all purposes). Likewise, exhaust poppet valve 54 may be operated by a variable valve activating/deactivating actuator 58, which may a cam driven valve operator (e.g., as shown in U.S. Pat. Nos. 9,605,603; 7,404,383; and 7,159,551 all of which are hereby fully incorporated by reference for all purposes). Further, the phase of intake valves 52 and exhaust valves 54 may be adjusted relative to crankshaft 40, thereby adjusting intake and exhaust valve opening and closing locations relative to crankshaft 40. Intake poppet valve 52 and exhaust poppet valve 54 may be deactivated and held in a closed position preventing flow into and out of cylinder 30 for one or more entire engine cycles (e.g. two engine revolutions), thereby deactivating cylinder 30. Flow of fuel supplied to cylinder 30 may also cease when cylinder 30 is deactivated.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Engine air intake system 9 includes intake manifold 44, throttle 62, grid heater 16, charge air cooler 163, turbocharger compressor 162, and intake plenum 42. Intake manifold 44 is shown communicating with optional electronic throttle 62 which adjusts a position of throttle plate 64 to control air flow from intake boost chamber 46. Compressor 162 draws air from air intake plenum 42 to supply boost chamber 46. Compressor vane actuator 84 adjusts a position of compressor vanes 19. Exhaust gases spin turbine 164 which is coupled to turbocharger compressor 162 via shaft 161. In some examples, a charge air cooler 163 may be provided. Further, an optional grid heater 16 may be provided to warm air entering cylinder 30 when engine 10 is being cold started.

Compressor speed may be adjusted via adjusting a position of turbine variable vane control actuator 78 or compressor recirculation valve 158. In alternative examples, a waste gate 79 may replace or be used in addition to turbine variable vane control actuator 78. Turbine variable vane control actuator 78 adjusts a position of variable geometry turbine vanes 166. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve may allow exhaust gases to flow around turbine 164 so as to reduce the amount of energy supplied to the turbine. Compressor recirculation valve 158 allows compressed air at the outlet 15 of compressor 162 to be returned to the inlet 17 of compressor 162. Alternatively, a position of compressor variable vane actuator 78 may be adjusted to change the efficiency of compressor 162. In this way, the efficiency of compressor 162 may be reduced so as to affect the flow of compressor 162 and reduce the possibility of compressor surge. Further, by returning air back to the inlet of compressor 162, work performed on the air may be increased, thereby increasing the temperature of the air. Air flows into engine 10 in the direction of arrows 5.

In this example, engine 10 is a diesel engine. However, in other examples, engine 10 may include a spark plug (not shown) and it may combust gasoline instead of diesel.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, propulsive effort pedal position, battery SOC, etc.). Navigation system 8 may provide vehicle position information data, road grade data, and vehicle altitude data to controller 12. Navigation system 8 may receive global positioning data from satellites as shown in FIG. 5. Traffic information system 3 may provide traffic data including but not limited to speeds of other vehicles at locations at locations that are different from the present vehicle's location, volume of traffic, hazards, delays, construction, etc.

Combustion is initiated in the combustion chamber 30 when fuel automatically ignites via combustion chamber temperatures reaching the auto-ignition temperature of the fuel that is injected to cylinder 30. The temperature in the cylinder increases as piston 36 approaches top-dead-center compression stroke. Exhaust gases may be processed via after treatment system 89, which may include sensors and emissions control devices as described herein. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures optional glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via optional pressure sensor 67, alternatively or in addition, sensor 67 may also sense cylinder temperature.

Emissions device 71 may include an oxidation catalyst and it may be followed by a selective catalytic reduction (SCR) catalyst or other exhaust gas after treatment device. After treatment system 89 may also include a diesel exhaust catalyst (DEC) 73 and a diesel particulate filter (DPF) 86. The DEC 73 may be positioned upstream of the DPF 86 so that heat from the DEC 73 may be transferred to the DPF 86 during DPF regeneration (e.g., oxidation of soot within the DPF). In other examples, a LNT may be placed at 73 or 86. Exhaust flows in the direction that is indicated by arrow 7.

After treatment system 89 also includes a temperature sensor 140 and an oxygen sensor 141 that are positioned upstream of injector 142 according to the direction of exhaust flow. After treatment system 89 also includes a downstream oxygen sensor 143, a first downstream temperature sensor 144, and a second downstream temperature sensor 145. Injector may inject a reductant (e.g., diesel fuel) from tank 26. An exhaust gas air-fuel ratio differential may be determined across injector 142 by subtracting an air-fuel ratio sensed via oxygen sensor 141 from an air-fuel ratio sensed by oxygen sensor 143. In some examples, oxygen sensor 143 may be positioned downstream of DPF 86. Alternatively, an exhaust gas oxygen concentration differential may be determined across injector 142 by subtracting an oxygen concentration sensed via oxygen sensor 141 from an oxygen concentration sensed by oxygen sensor 143. A temperature differential across DEC 73 may be determined by subtracting a temperature observed by temperature sensor 144 from a temperature observed by temperature sensor 140. In addition, a temperature differential across DEC 73 and DPF 86 may be determined by subtracting a temperature observed by temperature sensor 145 from a temperature observed by temperature sensor 140.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may be cooled via passing through EGR cooler 85. EGR may also be provided via low pressure EGR system 75. Low pressure EGR system 75 includes EGR passage 77 and EGR valve 76. Low pressure EGR may flow from downstream of DPF 86 to a location upstream of compressor 162. Low pressure EGR system 75 may include an EGR cooler 74. Additionally, EGR may be provided via overlap of opening times of exhaust valve 54 and intake valve 52.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Read-only memory 106 may include a plurality of software modules 106a that perform specific engine control functions (e.g., fuel injection control, EGR control, emissions control). Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to a propulsive effort pedal 130 for sensing pedal position adjusted by human foot 132; a measurement of engine manifold pressure (MAP) from pressure sensor 121 coupled to intake manifold 44 (alternatively or in addition sensor 121 may sense intake manifold temperature); boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine system, comprising: a navigation system; a traffic information system; an internal combustion engine including an actuator; an after treatment system coupled to the internal combustion engine; and a controller including executable instructions stored in non-transitory memory that cause the controller to receive data from the traffic monitoring system, receive data from the navigation system, model a temperature of an after treatment system, and model tailpipe exhaust gas emissions according to the data from the navigation system and the data from the traffic monitoring system, and executable instructions to model tailpipe exhaust gas emissions according to the data from the navigation system, data from the traffic monitoring system, and modeled maximum exhaust gas heating actions in response to the modeled tailpipe exhaust gas emissions not being less than threshold emissions.

In addition, the engine system further comprises additional instructions to increase exhaust gas temperature of the internal combustion engine via performing maximum exhaust gas heating actions in response to the modeled tailpipe exhaust gas emissions not being less than threshold emissions levels. Increasing exhaust gas heating may reduce feedgas and/or tailpipe emissions. The engine system includes where performing maximum exhaust gas heating actions includes retarding fuel injection timing, advancing exhaust valve opening timing, and increasing an amount of fuel injected to the internal combustion engine. The engine system further comprises additional instructions to minimize exhaust gas heating actions and fuel consumption by the internal combustion engine in response to the modeled tailpipe exhaust gas emissions being less than threshold emissions levels. The engine system includes where the exhaust gas temperature is increased via retarding fuel injection timing. The engine system includes where the exhaust gas temperature is increased via adjusting exhaust valve timing. The engine system includes where adjusting exhaust valve timing includes advancing exhaust valve opening timing. The engine system includes where modeled tailpipe exhaust gas emissions include NOx. The engine system also includes where modeled tailpipe exhaust gas emissions include HC.

Figure 2:
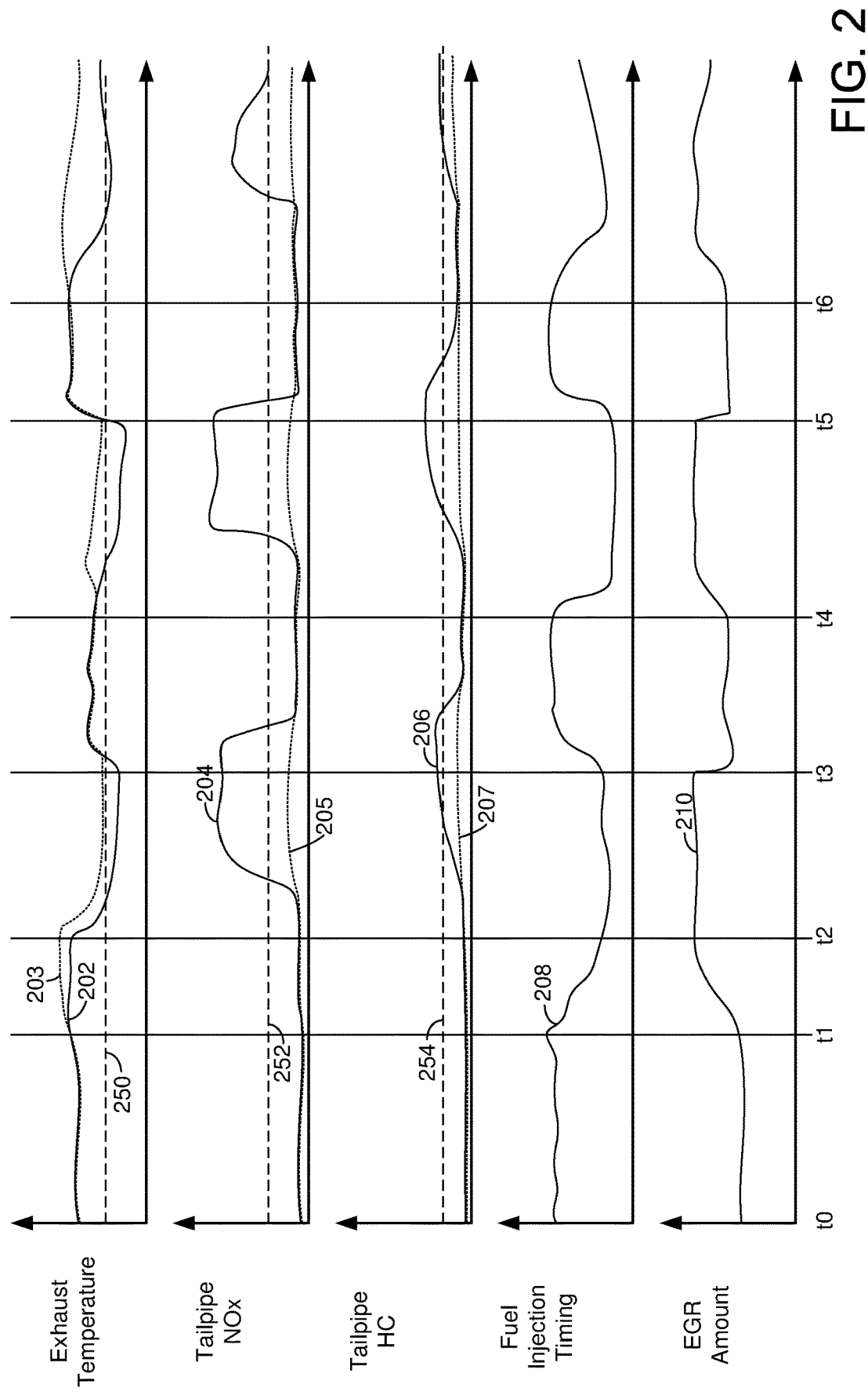
FIG. 2 shows an example engine operating sequence according to the method of FIGS. 3 and 4.

Turning now to FIG. 2, an example prophetic sequence for adjusting engine operation in response to modeled expected engine behavior is shown. The sequence of FIG. 2 may be provided via the system of FIG. 1 and the method of FIG. 3. The operating sequence of FIG. 2 may be provided via the system of FIG. 1 executing instructions according to the method of FIG. 3 that are stored in non-transitory memory. Vertical markers t0-t6 represent times of interest during the sequence. All plots in FIG. 2 are aligned in time and occur at a same time.

The first plot from the top of FIG. 2 is a plot of engine feedgas exhaust temperature versus time. The vertical axis represents engine feedgas exhaust temperature and the engine feedgas exhaust temperature increases in the direction of the vertical axis arrow. The horizontal axis represents time and time increases from the left side of the plot to the right side of the plot. Curve 202 represents modeled nominal engine feedgas exhaust temperature and the modeled nominal engine feedgas exhaust temperature is determined before the timing shown in FIG. 2. Curve 203 represents the present engine feedgas exhaust temperature or the feedgas exhaust temperature when engine operation is adjusted based on modeled engine feedgas exhaust temperature and emissions. Horizontal line 250 represents a light-off temperature (e.g., a temperature at which a device in the after treatment system may achieve a threshold efficiency level) for an oxidation catalyst in the engine exhaust after treatment system.

The second plot from the top of FIG. 2 is a plot of tailpipe NOx flow rate versus time. The vertical axis indicates tailpipe NOx flow rate (e.g., NOx flow rate out of the vehicle) and the tailpipe NOx flow rate increases in the direction of the vertical axis arrow. The horizontal axis represents time and time increases from the left side of the plot to the right side of the plot. Curve 204 represents the modeled nominal tailpipe NOx flow rate and the modeled nominal tailpipe NOx is determined before the timing shown in FIG. 2. Curve 205 represents present tailpipe NOx or tailpipe NOx when engine operation is adjusted based on modeled engine feedgas exhaust temperature and emissions. Line 252 represents a NOx flow rate threshold. Engine NOx emissions may not meet statutory levels when the NOx flow rate is above threshold 252.

The third plot from the top of FIG. 2 is a plot of modeled tailpipe HC flow rate versus time. The vertical axis indicates tailpipe HC flow rate (e.g., HC flow rate out of the vehicle) and the tailpipe HC flow rate increases in the direction of the vertical axis arrow. The horizontal axis represents time and time increases from the left side of the plot to the right side of the plot. Curve 206 represents the modeled nominal tailpipe HC flow rate and the modeled nominal tailpipe HC flow rate is determined before the timing shown in FIG. 2. Curve 207 represents present tailpipe HC or tailpipe HC when engine operation is adjusted based on modeled engine feedgas exhaust temperature and emissions. Line 254 represents a HC flow rate threshold. Engine HC emissions may not meet statutory levels when the HC flow rate is above threshold 254.

The fourth plot from the top of FIG. 2 is a plot of engine fuel injection timing versus time. The vertical axis represents engine fuel injection timing and fuel injection timing advances in the direction of the vertical axis arrow. The horizontal axis represents time and time increases from the left side of the plot to the right side of the plot. Line 208 indicates the engine fuel injection timing.

The fifth plot from the top of FIG. 2 is a plot of engine EGR amount versus time. The vertical axis represents the engine EGR amount and the engine EGR amount increases in the direction of the vertical axis arrow. The horizontal axis represents time and time increases from the left side of the plot to the right side of the plot. Line 210 represents the engine EGR amount.

At time t0, the modeled nominal exhaust temperature is at a higher level and the modeled nominal tailpipe NOx is at a lower level. The fuel injection timing is advanced and the engine EGR amount is at a middle level. The present engine exhaust temperature follows modeled exhaust temperature. The present tailpipe NOx follows modeled nominal tailpipe NOx. The present tailpipe HC follows modeled nominal tailpipe HC. Such conditions may be present when the vehicle is at cruising speed.

At time t1, engine actuators are adjusted to increase engine feedgas temperature in response to the modeled nominal engine feedgas temperature that was determined at an earlier time. By increasing feedgas temperature, it may be possible to increase a temperature of after treatment components before the engine reaches conditions where engine load is expected to be lowered so that after treatment components may remain above light-off temperature. In this example, the fuel injection timing is retarded and the EGR amount is increased. In gasoline engines, spark timing may also be retarded. The tailpipe NOx and HC remain at lower levels and engine feedgas temperature begins to increase due to the retarded fuel injection timing.

At time t2, the engine load is reduced (not shown) and the modeled nominal engine feedgas temperature begins to fall. The present engine feedgas temperature begins to fall, but it is at a higher level than the modeled nominal engine feedgas temperature. The modeled nominal tailpipe NOx and present tailpipe NOx are at lower levels. The modeled nominal tailpipe HC and present tailpipe HC are at lower levels. The fuel injection timing is retarded and the EGR amount is increased to keep the present engine exhaust temperature elevated.

Between time t2 and time t3, the modeled and present engine feedgas temperatures fall, but the present feedgas temperature remains above threshold 250. By maintaining the engine feedgas temperature above threshold 250, present tailpipe NOx and HC levels are kept low. The fuel injection timing is retarded and the EGR amount is at a higher level. The modeled nominal tailpipe NOx and HC are above thresholds 252 and 254. The present tailpipe NOx and HC are below thresholds 252 and 254 due to the present engine feedgas temperature being above threshold 250.

At time t3, the engine load is increased (not shown) and the modeled nominal engine feedgas temperature begins to increase. The present engine feedgas temperature begins to increase and it remains above threshold 250. The modeled nominal tailpipe NOx is at higher level because the modeled engine feedgas temperature has been at a lower level that may allow after treatment system components to cool. The present tailpipe NOx is at a lower level since the present engine feedgas temperature is higher than threshold 250. The modeled nominal tailpipe HC is at higher levels because the modeled feedgas temperature has been at a lower level that may allow the after treatment system to cool. The present tailpipe HC is low since the present feedgas exhaust temperature has remained above threshold 250. The fuel injection timing begins to advance and the EGR amount begins to decrease since the increasing feedgas temperature keeps the present engine exhaust temperature elevated above threshold 250. Thus, the engine actuators that increase engine feedgas temperature are returned to their base positions.

Between time t3 and time t4, the modeled and present engine feedgas temperatures increase to levels above threshold 250. The present tailpipe NOx and HC levels remain low and the modeled tailpipe NOx and HC decrease. The fuel injection timing is advanced and the EGR amount is decreased.

At time t4, engine actuators are adjusted a second time to increase engine feedgas temperature in response to the modeled nominal engine feedgas temperature that was determined at an earlier time. Specifically, the fuel injection timing is retarded and the EGR amount is increased. The fuel injection timing and EGR amount are adjusted in response to the modeled nominal engine feedgas temperature that occurs between time t4 and time t5 where the modeled engine feedgas temperature falls below threshold 250. The present tailpipe NOx and HC remain at lower levels and engine feedgas temperature begins to increase due to the retarded fuel injection timing.

Between time t4 and time t5, the modeled nominal engine feedgas temperature falls and the present engine feedgas temperature increases due to the engine operating at a lower load (not shown). The present engine feedgas temperature remains above threshold 250. The fuel injection timing is retarded and the EGR amount is at a higher level. The modeled nominal tailpipe NOx and HC increase to levels that are above thresholds 252 and 254. The present tailpipe NOx and HC remain at levels that are below thresholds 252 and 254 due to the present engine feedgas temperature being above threshold 250.

At time t5, the engine load is increased (not shown) and the modeled nominal engine feedgas temperature begins to rise. The present engine feedgas temperature also begins to rise. The modeled nominal tailpipe NOx is at a higher level and the present NOx is at a lower level. The present NOx is at the lower level since the present engine feedgas temperature is higher. The modeled nominal tailpipe HC are also at a higher level and the present tailpipe HC are at a lower level. The present HC is at the lower level since the present engine feedgas temperature is higher. The fuel injection timing begins to be advanced to improve fuel economy and the EGR amount begins to be reduced.

Between time t5 and time t6, the modeled and present engine feedgas temperatures increase and they are at levels that are above threshold 250. The fuel injection timing is advanced and the EGR amount is reduced. The modeled nominal tailpipe NOx and HC are reduced to levels that are below thresholds 252 and 254. The present tailpipe NOx and HC are below thresholds 252 and 254 due to the present engine feedgas temperature being above threshold 250.

At time t6, the engine load is decreased (not shown) again and the modeled nominal engine feedgas temperature begins to decrease shortly after time t6. The fuel injection timing begins to be retarded and EGR amount begins to be increased. The present engine feedgas temperature begins to increase and it remains above threshold 250. The modeled nominal tailpipe NOx is at level that is lower than threshold 252. Likewise, the present tailpipe NOx is at a level that is lower than threshold 252. The modeled nominal tailpipe HC is at a lower level that is less than threshold 254. Similarly, the present tailpipe HC is less than threshold 254.

Thus, adjustments may be made to engine actuators based on modeled engine behavior (e.g., exhaust feedgas temperature, tailpipe NOx, and tailpipe HC) before an engine reaches conditions that may cause a deterioration of vehicle emissions so that vehicle emissions may meet statutory levels. For example, before an engine reaches conditions where engine load is low, the engine actuators may be adjusted to elevate engine exhaust feedgas temperatures so that after treatment device temperatures may increase, thereby extending a period where the after treatment system may be more effective.

Figure 3:
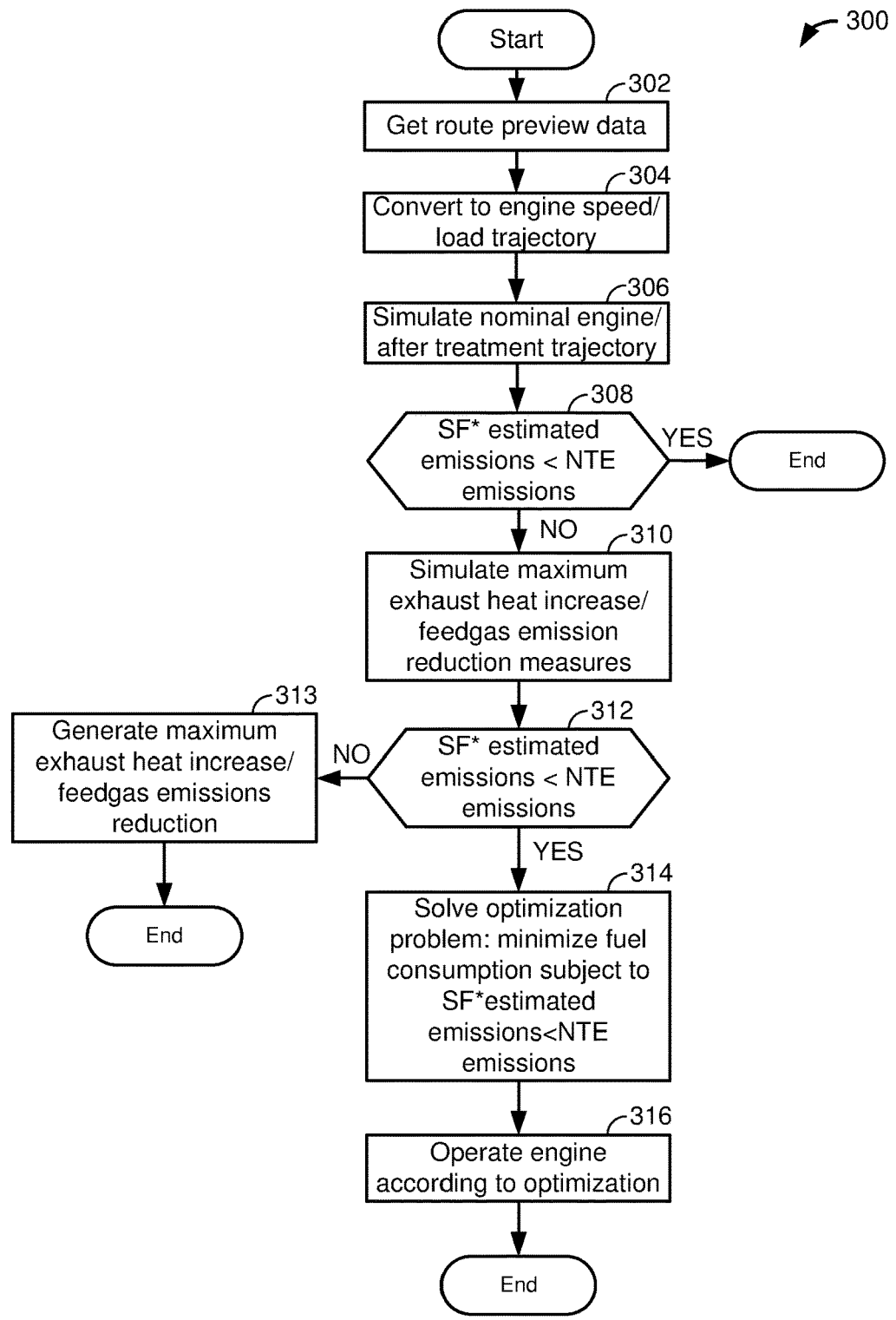
FIG. 3 shows an example method for operating an engine in a way that may reduce tailpipe emissions.
Figure 4:
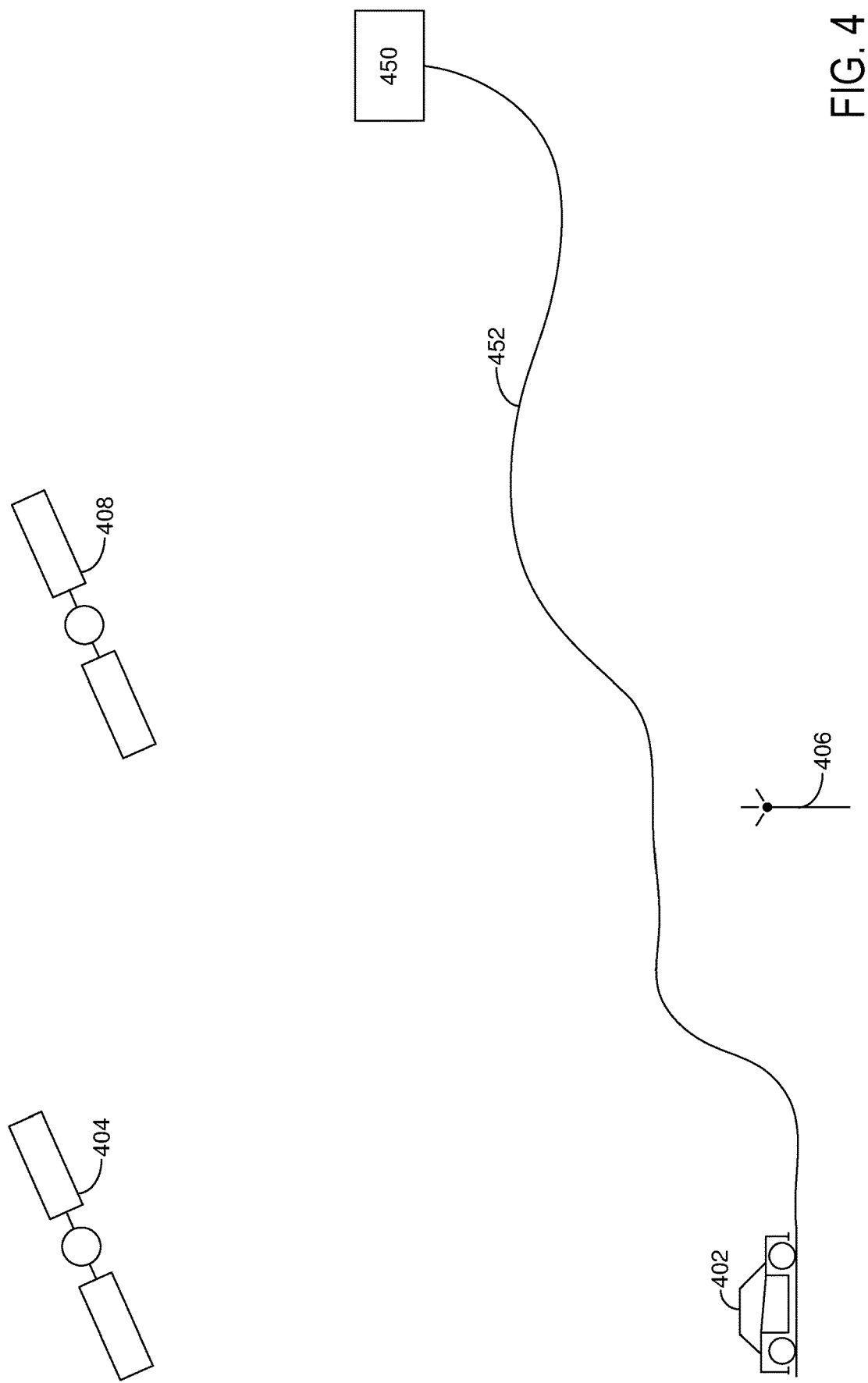
FIG. 4 shows an example operating environment for a vehicle that includes the system described herein.

Referring now to FIG. 3, a method for operating a vehicle and an engine is shown. The method of FIG. 3 may be stored as executable instructions in non-transitory memory of a controller in systems such as are shown in FIG. 1. The method of FIG. 3 may be incorporated into and may cooperate with the systems of FIG. 1. Further, portions of the method of FIG. 3 may be performed via a controller transforming operating states of devices and actuators in the physical world. The controller may employ engine actuators of the engine system to adjust engine operation according to the method described below. Further, method 300 may determine selected control parameters as described below from sensor inputs.

At 302, method 300 gets travel route data for the vehicle. The vehicle's driver may input a destination address into a navigation system 8 that receives global positioning data from one or more satellites. The navigation system 8 may break the travel route into a plurality of segments or preview horizons from the vehicle's present location to the vehicle's destination. The travel route data may include road grade values for particular sections of roads along the travel route, altitude data for particular sections of roads along the travel route, traffic sign/signal locations, and speed limits for particular sections of roads along the travel route. The sections of roads for which route data is determined may be in front of or ahead of the vehicle's present location. Method 300 proceeds to 304.

At 304, method 300 converts the travel route date into expected or modeled engine speed and load values. In one example, method 300 estimates engine speed and load values along the vehicle's travel route based on the travel route data and known vehicle operating characteristics. For example, method 300 may forecast or estimate engine speed and load at positions along the vehicle travel route via a function call to a model. The model may include functions and/or tables that describe engine operation as a function of vehicle speed and force for the vehicle to achieve a posted speed limit. The data in the functions and tables may be empirically determined. For example, method 300 may input vehicle speed, road grade, and a shift schedule (e.g., defines which transmission gear is engaged according to vehicle speed and propulsive pedal position) into a function that returns a transmission gear. The engine speed and load may then be determined from the transmission gear, vehicle speed, and road grade. In one example, method determines the engine speed and load for a particular road segment via the following equations:

$$gear = f1(road\_grade, speed\_limit, vehicle\_mass, shift\_schedule)$$

$$(Eng\_speed, Eng\_load) = f2(road\_grade, speed\_limit, vehicle\_mass, altitude, gear)$$

where gear is a transmission gear that is forecast or predicted to be engaged at a particular road segment or preview horizon of the travel route, road_grade is the road grade at the particular road segment of the travel route, speed_limit is the maximum speed a vehicle may travel on a particular road segment, vehicle_mass is the vehicle's mass, shift_schedule is a transmission gear shift schedule which defines which transmission gear is forecast for the particular road segment, f1 is a function that returns a transmission gear number, Eng_speed is an engine speed, Eng_load is an engine load, f2 is a function that returns the engine speed and load, and altitude is the vehicle's altitude at the particular road segment of the travel route. The values stored in functions f1 and f2 may be empirically determined and stored in tables or functions in controller memory. Method 300 proceeds to 306 after engine speeds and loads for the plurality of segments that make of the vehicle's travel route.

At 306, method 300 estimates or models engine feedgas temperature, tailpipe NOx, and tailpipe HC for the plurality of segments in the vehicle's travel route for nominal engine operation (e.g., engine operation that has not been modified according to the vehicle's travel route data received from the navigation system). In one example, method 300 determined engine feedgas temperature via the following function:

$$\text{Engine\_fg\_temp\_}n = f3(\text{Eng\_speed}, \text{Eng\_load}, \text{Eng\_}T, \text{afr\_}n, \text{inj\_}t\_n, \text{Ev\_}t\_n, \text{In\_}t\_n, \text{spk\_}t\_n, \text{EGR}, \text{boost})$$

where Engine_fg_temp_n is the nominal engine feedgas temperature for a particular vehicle travel route segment, f3 is a function that returns the nominal engine feedgas temperature value, Eng_speed is the engine speed at the particular vehicle travel route segment, Eng_load is the engine load at the particular vehicle travel route segment, Eng_T is engine temperature at the particular vehicle travel route segment, and afr_n is the engine's nominal air-fuel ratio for gasoline engines (e.g., 14.7), inj_t_n is the engine's nominal fuel injection timing (e.g., start of injection and end of injection timing when not adjusted for road conditions); Ev_t_n is the engine's nominal exhaust valve timing (e.g., opening and closing timings when not adjusted for road conditions), In_t_n is the engine's nominal intake valve timing (e.g., opening and closing timings when not adjusted for road conditions), spark_t_n is the engine's nominal spark timing for gasoline engines (e.g., spark timings when not adjusted for road conditions), EGR is the exhaust gas recirculation amount, and boost is the boost pressure amount.

In one example, method 300 determines after treatment system temperature via the following function:

$$\text{After\_}T\_\text{temp\_}n = f4(\text{Eng\_speed}, \text{Eng\_load}, \text{Engine\_fg\_temp\_}n, \text{vspd}, T\text{env})$$

where After_T_temp_n is the nominal temperature of the after treatment system for a particular vehicle travel route segment, f4 is a function that returns the nominal after treatment temperature value, vspd is vehicle speed, and Tenv is ambient temperature, and the other variables are as previously described. The vehicle speed and ambient temperature are included to compensate for heat loss that may be due to vehicle speed.

In one example, method 300 determines tailpipe NOx via the following function:

$$\text{Tail\_}NOx\_n = f5(\text{Eng\_speed}, \text{Eng\_load}, \text{After\_}T\_\text{temp\_}n, \text{Eng\_}T, \text{afr\_}n, \text{inj\_}t\_n, \text{Ev\_}t\_n, \text{In\_}t\_n, \text{spark\_}t\_n)$$

where Tail_NOx_n is the nominal amount of tailpipe NOx (e.g., NOx that exits the exhaust system), f5 is a function that returns the nominal tailpipe NOx amount, and the other variables are as previously described.

In one example, method 300 determines tailpipe HC via the following function:

$$\text{Tail\_}HC\_n = f6(\text{Eng\_speed}, \text{Eng\_load}, \text{After\_}T\_\text{temp\_}n, \text{Eng\_}T, \text{afr\_}n, \text{inj\_}t\_n, \text{Ev\_}t\_n, \text{In\_}t\_n, \text{spark\_}t\_n)$$

where Tail_HC_n is the nominal amount of tailpipe HC (e.g., HC that exits the exhaust system), f6 is a function that returns the nominal tailpipe HC amount, and the other variables are as previously described. Method 300 proceeds to 308.

At 308, method 300 judges if a predetermined value SF multiplied by the nominal tailpipe HC emissions and the nominal tailpipe NOx emissions are less than NTE emissions (e.g., X HC, and Y NOx, where X and Y depend on statutory emissions levels of an emissions jurisdiction). If so, the answer is yes and method 300 proceeds to exit such that engine operation for a particular segment of the travel route is not altered according to modeled NOx and HC emissions from the vehicle. If not, the answer is no and method 300 proceeds to 310.

At 310, method 300 simulates a maximum feedgas exhaust heat increase and feedgas emission reductions. Method 300 may simulate the maximum feedgas exhaust heat increase via adjusting one or more actuators such that maximum feedgas exhaust heat is provided for a particular segment of the travel route. For example, method 300 may simulate maximum feedgas exhaust heat by adjusting fuel injection timing retard, spark timing retard for gasoline engines, and exhaust valve opening timing retard.

Method 300 may also simulate engine feedgas emission reduction measures via adjusting one or more actuators to reduce engine feedgas emissions. The maximum emissions reduction may be determined via the following equations:

$$\text{Engine\_fg\_temp\_}m = f7(\text{Eng\_speed}, \text{Eng\_load}, \text{Eng\_}T, \text{afr\_}m, \text{inj\_}t\_m, \text{Ev\_}t\_m, \text{In\_}t\_m, \text{spk\_}t\_m)$$

where Engine_fg_temp_m is the maximum engine feedgas temperature for a particular vehicle travel route segment, f7 is a function that returns the maximum engine feedgas temperature value, Eng_speed is the engine speed at the particular vehicle travel route segment, Eng_load is the engine load at the particular vehicle travel route segment, Eng_T is engine temperature at the particular vehicle travel route segment, and afr_m is the engine's air-fuel ratio for maximum exhaust temperature, inj_t_m is the engine's fuel injection timing (e.g., start of injection and end of injection timing for maximum exhaust temperature) for maximum feedgas exhaust temperature, Ev_t_m is the engine's exhaust valve timing for maximum exhaust temperature, In_t_m is the engine's intake valve timing for maximum exhaust temperature, spark_t_m is the engine's spark timing for maximum exhaust temperature gasoline engines (e.g., spark timings when not adjusted for road conditions).

In one example, method 300 determines maximum after treatment system temperature via the following function:

$$\text{After\_}T\_\text{temp\_}m = f8(\text{Eng\_speed}, \text{Eng\_load}, \text{Engine\_fg\_temp\_}m, \text{afr\_}m, \text{inj\_}t\_m, \text{spk\_}t\_m, \text{Eng\_}T, \text{Ev\_}t\_m, \text{In\_}t\_m)$$

where After_T_temp_m is the maximum temperature trajectory of the after treatment system for a particular vehicle travel route segment, f8 is a function that returns the maximum after treatment temperature values for the particular vehicle travel route segment, and the other variables are as previously described.

In one example, method 300 determines minimum tailpipe NOx via the following function:

$$Tail\_NOx\_m = f9(Eng\_speed, Eng\_load, After\_T\_temp\_m, afr\_m, spk\_t\_m, Eng\_T, Ev\_t\_m, In\_t\_m)$$

where Tail_NOx_m is the minimum amount of tailpipe NOx (e.g., NOx that exits the exhaust system), f9 is a function that returns the minimum tailpipe NOx amount, and the other variables are as previously described.

In one example, method 300 determines minimum tailpipe HC via the following function:

$$Tail\_HC\_m = f10(Eng\_speed, Eng\_load, After\_T\_temp\_m, afr\_m, spk\_t\_m, Eng\_T, Ev\_t\_m, In\_t\_m)$$

where Tail_HC_m is the minimum amount of tailpipe HC (e.g., HC that exits the exhaust system), f10 is a function that returns the maximum tailpipe HC amount, and the other variables are as previously described.

At 312, method 300 judges if a predetermined value SF multiplied by the minimum tailpipe HC emissions and the minimum tailpipe NOx emissions are less than NTE emissions (e.g., X HC, and Y NOx, where X and Y depend on statutory emissions levels of an emissions jurisdiction). If so, the answer is yes and method 300 proceeds to 314. If not, the answer is no and method 300 proceeds to 313. Thus, if there is an opportunity to optimize exhaust heat increase to meet NTE emissions, method 300 proceeds to 314. If not, method 300 proceeds to 313 to emphasize emissions reductions.

At 313, method 300 generates the maximum exhaust heat increase in the engine feedgas exhaust temperature and reduces feedgas emissions via increasing the engine feedgas exhaust temperature and after treatment device temperature. In particular, method 300 may retard fuel injection timing, retard exhaust valve timing, adjust engine air-fuel ratio, adjust engine spark timing for gasoline engines, and adjust intake valve timing. Method 300 proceeds to exit.

At 314, method 300 solves an optimization process subject to a predetermined number SF multiplied by estimated tailpipe emissions for HC and the predetermined number SF multiplied by estimated tailpipe emissions for NOx. In one example, the optimization process may be described by the following optimization equations:

$$\text{Minimize}(U(t))J = m\_fuel$$

Subject to: $NOx\ Constraint \leq NTE*s.f.$

Subject to: $HC\ Constraint \leq NTE*s.f.$ $$(Eng\_T, afr\_m, inj\_t\_m, Ev\_t\_m, In\_t\_m, spk\_t\_m) = f11(Eng\_speed, Eng\_load)$$

Method 300 proceeds to 315.

At 315, method 300 adjusts engine actuators to operate the engine according to the optimization results at 314. Method 300 proceeds to exit.

In this way, operation of an engine may be adjusted to meet statutory emissions levels according to a way a vehicle is expected to operate along a travel route. The engine actuator adjustments to achieve desired emissions levels and fuel economy may be determined before the vehicle gets to locations along the travel route where the actuator adjustments are actually made so that the after treatment system may be warmed before the vehicle reaches a location where engine output is reduced so that vehicle emissions may remain at lower levels.

Thus, method 300 provides for a method for operating an engine, comprising: predicting vehicle operating conditions including an exhaust gas temperature profile according to navigational data and traffic data along a travel route; and adjusting an actuator to provide a requested amount of exhaust gas heat to maintain or increase exhaust gas temperature according to engine feedgas emissions required to achieve a target emissions level while minimizing fuel consumption based on an expected vehicle speed and engine load profile according to the travel route. The engine method includes where the actuator is a fuel injector. The engine method includes where the actuator is an EGR valve. The engine method includes where the actuator is a cam. The engine method includes where the actuator is a turbocharger. The engine method includes where the requested amount of exhaust heat is increased before vehicle operating conditions are vehicle operating conditions where an after treatment device temperature is reduced. The engine method includes where vehicle operating conditions where the after treatment device temperature is reduce includes an engine idle condition or where vehicle speed is being reduced.

In addition, the method of FIG. 3 provides for a method for operating an engine, comprising: predicting nominal vehicle operating conditions including an exhaust gas temperature profile according to navigational data and traffic data along a travel route; predicting vehicle emissions according to the predicted nominal vehicle operating conditions; predicting a maximum thermal management trajectory in response to the predicted vehicle emissions not being less than threshold emissions; and generating a maximum exhaust gas heat increase via an engine in response to a vehicle emissions level determined according to the maximum thermal management trajectory. The method includes where the maximum exhaust gas heat increase is generated via retarding fuel injection timing. The method includes where the maximum exhaust gas heat increase is generated via advancing exhaust valve opening timing. The method further comprises minimizing fuel consumption subject to the vehicle emissions level being less than a threshold level. The method includes where the navigational data is provided for a predetermined travel route.

Turning now to FIG. 4, an example environment where the method of FIG. 3 and the system of FIG. 1 may be applied is shown. Vehicle 402 may travel along a predetermined travel route 452 that is determined via the navigation system 8 shown in FIG. 1. The predetermined travel route 452 may include a destination 450 and the vehicle's present location. The vehicle's present location may be determined via global positioning data that is provided via satellites 404 and 408. Vehicle 402 may also receive traffic data via stationary traffic data antenna 406. Vehicle 402 may include the engine and after treatment system shown in FIG. 1, which may include the method of FIG. 4.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an engine, comprising:
predicting vehicle operating conditions including an exhaust gas temperature profile according to navigational data and traffic data along a travel route; and
adjusting an actuator to provide a requested amount of exhaust gas heat to maintain or increase exhaust gas temperature according to engine feedgas emissions required to achieve a target emissions level while minimizing fuel consumption based on an expected vehicle speed and engine load profile according to the travel route.

2. The engine method of claim 1, where the actuator is a fuel injector.

3. The engine method of claim 1, where the actuator is an exhaust gas recirculation (EGR) valve.

4. The engine method of claim 1, where the actuator is a cam.

5. The engine method of claim 1, where the actuator is a turbocharger.

6. The engine method of claim 1, where the requested amount of exhaust gas heat is increased before vehicle operating conditions are vehicle operating conditions where an after treatment device temperature is reduced.

7. The engine method of claim 6, where vehicle operating conditions where the after treatment device temperature is reduce includes an engine idle condition or where vehicle speed is being reduced.

8. An engine system, comprising:
a navigation system;
a traffic information system;
an internal combustion engine including an actuator;
an after treatment system coupled to the internal combustion engine; and
a controller including executable instructions stored in non-transitory memory that cause the controller to receive data from the traffic monitoring system, receive data from the navigation system, model a temperature of an after treatment system, and model tailpipe exhaust emissions according to the data from the navigation system and the data from the traffic monitoring system, and executable instructions to model tailpipe exhaust emissions according to the data from the navigation system, data from the traffic monitoring system, and modeled maximum exhaust heating actions in response to the modeled tailpipe exhaust emissions not being less than threshold emissions.

9. The engine system of claim 8, further comprising additional instructions to increase exhaust gas temperature of the internal combustion engine via performing maximum exhaust gas heating actions in response to the modeled tailpipe exhaust emissions not being less than threshold emissions levels.

10. The engine system of claim 9, where performing maximum exhaust gas heating actions includes retarding fuel injection timing, advancing exhaust valve opening timing, and increasing an amount of fuel injected to the internal combustion engine.

11. The engine system of claim 9, further comprising additional instructions to minimize exhaust gas heating actions and fuel consumption by the internal combustion engine in response to the modeled tailpipe exhaust emissions being less than threshold emissions levels.

12. The engine system of claim 11, where the exhaust temperature is increased via retarding fuel injection timing.

13. The engine system of claim 11, where the exhaust temperature is increased via adjusting exhaust valve timing.

14. The engine system of claim 13, where adjusting exhaust valve timing includes advancing exhaust valve opening timing.

15. The engine system of claim 9, where modeled tailpipe exhaust emissions include NOx.

16. A method for operating an engine, comprising:
predicting nominal vehicle operating conditions including an exhaust gas temperature profile according to navigational data and traffic data along a travel route;
predicting vehicle emissions according to the predicted nominal vehicle operating conditions;
predicting a maximum thermal management trajectory in response to the predicted vehicle emissions not being less than threshold emissions; and
generating a maximum exhaust gas heat increase via an engine in response to a vehicle emissions level determined according to the maximum thermal management trajectory.

17. The method of claim 16, where the maximum exhaust gas heat increase is generated via retarding fuel injection timing.

18. The method of claim 16, where the maximum exhaust gas heat increase is generated via advancing exhaust valve opening timing.

19. The method of claim 18, further comprising minimizing fuel consumption subject to the vehicle emissions level being less than a threshold level.

20. The method of claim 16, where the navigational data is provided for a predetermined travel route.

* * * * *